United States Patent
Durham et al.

(10) Patent No.: US 11,940,927 B2
(45) Date of Patent: Mar. 26, 2024

(54) TECHNOLOGIES FOR MEMORY TAGGING

(71) Applicant: Intel Corporation, Santa Clara, CA (US)

(72) Inventors: David M. Durham, Beaverton, OR (US); Michael D. LeMay, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/839,877

(22) Filed: Jun. 14, 2022

(65) Prior Publication Data

US 2022/0318158 A1    Oct. 6, 2022

(51) Int. Cl.
| | |
|---|---|
| *G06F 12/00* | (2006.01) |
| *G06F 12/02* | (2006.01) |
| *G06F 12/1009* | (2016.01) |
| *G06F 12/1045* | (2016.01) |
| *G06F 12/14* | (2006.01) |

(52) U.S. Cl.
CPC ...... *G06F 12/1009* (2013.01); *G06F 12/0238* (2013.01); *G06F 12/1063* (2013.01); *G06F 12/1408* (2013.01)

(58) Field of Classification Search
CPC ............ G06F 12/1009; G06F 12/0238; G06F 12/1063; G06F 12/1408; G06F 12/1027; G06F 12/1441; G06F 2212/1052; G06F 12/145; G06F 12/1475
See application file for complete search history.

(56) References Cited

U.S. PATENT DOCUMENTS

| | | | | |
|---|---|---|---|---|
| 5,568,410 | A | * 10/1996 | Bechade | ........... G06F 7/74 708/211 |
| 9,436,847 | B2 | 9/2016 | Durham et al. | |
| 2009/0323383 | A1 | * 12/2009 | Mondaeev | ........... G11C 15/00 365/49.17 |
| 2019/0042402 | A1 | * 2/2019 | Chhabra | ........... G06F 9/45558 |
| 2019/0042799 | A1 | * 2/2019 | Durham | ........... G06F 21/64 |
| 2019/0196977 | A1 | * 6/2019 | Cong | ........... G06F 12/10 |
| 2019/0227951 | A1 | 7/2019 | Durham et al. | |
| 2020/0210070 | A1 | 7/2020 | Durham | |
| 2020/0409868 | A1 | 12/2020 | Durham | |

OTHER PUBLICATIONS

"Memory Tagging Extension (MTE)—ARM," WikiChip, last modified Jul. 26, 2019; accessed Jun. 15, 2022 from https://en.wikichip.org/wiki/arm/mte; 2 pages.
EPO European Extended Search Report in EP Application Serial No. 23169097.5 dated Nov. 8, 2023 (7 pages).

* cited by examiner

*Primary Examiner* — Arvind Talukdar
(74) *Attorney, Agent, or Firm* — Alliance IP, LLC

(57) ABSTRACT

Techniques for memory tagging are disclosed. In the illustrative embodiment, 16 bits of a virtual memory address are used as memory tag bits. In a page table entry corresponding to the virtual memory address, page tag bits indicate which of the 16 bits of the virtual memory address are to be sent to the memory as memory tag bits when a memory operation is requested on the virtual memory address. The memory can then compare the memory tag bits sent with the physical memory address to memory tag bits stored on the memory that correspond to the physical memory address. If the memory tag bits match, then the operation is allowed to proceed.

16 Claims, 5 Drawing Sheets

TECHNOLOGIES FOR MEMORY TAGGING

BACKGROUND

Virtual memory pointers are used to map memory addresses for a process to physical memory locations. Memory pointers are vulnerable to several software bugs or security exploits, such as a buffer overflow, buffer underflow, and use-after-free. In a 64-bit system, not all of the bits of the virtual memory address may be needed. In some cases, some of the bits of a virtual memory address may be used to mitigate vulnerability from certain memory safety bugs. In some cases, every 16-byte memory location has four tag bits randomly assigned. Each memory pointer pointing to a memory location also has four tag bits in part of the virtual address that is otherwise unused. Every time the memory pointer is used to read or write the memory location, the tag bits in the memory pointer are compared to those of the memory location. If the tag bits do not match, then the memory operation is aborted.

DETAILED DESCRIPTION

Figure 1:
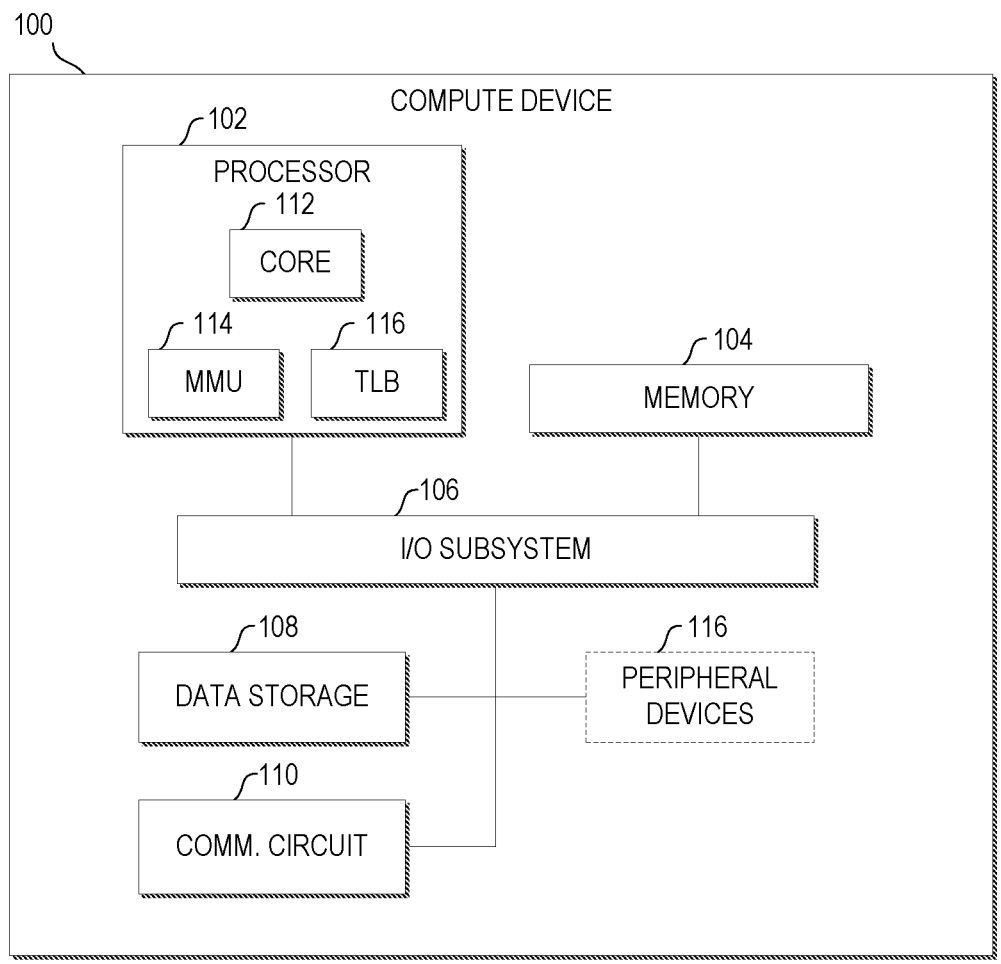
FIG. 1 is a simplified block diagram of at least one embodiment of a compute device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a simplified block diagram of an illustrative compute device 100 is shown. In use and as described in more detail below, the processor 102 sets one or more tag bits when allocating space in the memory 104. The processor 104 sets the tag bits in both the virtual address pointer and in a page table entry in a page table corresponding to the virtual address pointer. In the illustrative embodiment, the tag bits in the page table entry indicate which tag bits in the virtual address pointer are to be used in sending a memory operation to the memory 104. The memory 104 can then check if the tag bits are correct before performing the memory operation.

The compute device 100 may be embodied as any type of compute device. For example, the compute device 100 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, a distributed computing system, and/or any other computing device. The illustrative compute device 100 includes a processor 102, a memory 104, an input/output (I/O) subsystem 106, data storage 108, a communication circuit 110, and one or more optional peripheral devices 118. In some embodiments, one or more of the illustrative components of the compute device 100 may be incorporated in, or otherwise form a portion of, another component. For example, the memory 104, or portions thereof, may be incorporated in the processor 102 in some embodiments.

In some embodiments, the compute device 100 may be located in a data center with other compute devices 106, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves), a micro data center, etc.

The processor 102 may be embodied as any type of processor capable of performing the functions described herein. For example, the processor 102 may be embodied as a single or multi-core processor(s), a single or multi-socket processor, a digital signal processor, a graphics processor, a neural network compute engine, an image processor, a microcontroller, an infrastructure processing unit (IPU), a data processing unit (DPU), an xPU, or other processor or processing/controlling circuit. The illustrative processor 102 includes one or more processor cores 112. The processor 102 may include any suitable number of cores 112, such as any number from 2-1,024.

The processor 102 may also include a memory management unit (MMU) 114 and a translation lookaside buffer (TLB) 116. The MMU 114 manages translation between virtual and physical memory for each process running on the processor 102. When receiving a memory operation that includes a virtual memory address, the MMU 114 will look up a corresponding physical memory address in a page table stored in the memory 104. Memory address translations may be stored in the TLB 116, allowing the virtual memory address for a subsequent memory operation at the same virtual memory address to be translated more quickly. As discussed in more detail below, the MMU 114 may check whether memory tag bits in the virtual memory address are the correct values. In some embodiments, the processor 102 may have a cache hierarchy between the MMU 114 and the TLB 116.

The memory 104 may be embodied as any type of volatile or non-volatile memory or data storage capable of performing the functions described herein. In operation, the memory 104 may store various data and software used during operation of the compute device 100, such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations. The I/O subsystem 106 may connect various internal and external components of the compute device 100 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 106 may form a portion of a system-on-a-chip (SoC) and be incorporated, along with the processor 102, the memory 104, the NIC 110, and other components of the compute device 100 on a single integrated circuit chip.

In some embodiments, the memory 104 may implement memory tagging, in which the memory 104 will check whether certain bits of the physical address match memory tag bits for the corresponding memory address. For example, for a 64-bit memory address, the top 4 bits may be used as memory tag bits, and the bottom 48 bits may be used as the physical address, and other bits may be reserved, ignored, or compared to each other for consistency. The memory 104 may store 4 memory tag bits for each, e.g., 16 bytes of memory. If the memory tag bits stored in the memory 104 do not match the memory tag bits in the physical memory address, the memory 104 will not perform the memory operation. In some embodiments, tags may be stored in memory, and the associated tag may be looked up for an address from the memory from, for example, a sequestered region of memory. The tags retrieved from memory may then be cached near the core in an object cache that is then used to verify the memory tag in a virtual/linear address to the associated tag value for the address retrieved from memory. In other embodiments, error correction code (ECC) memory or other parallel memory access may be used to store tags per line of memory. Caches may be extended to carry tag values per cache line as additional metadata.

The data storage 108 may be embodied as any type of device or devices configured for the short-term or long-term storage of data. For example, the data storage 108 may include any one or more memory devices and circuits, memory cards, hard disk drives, solid-state drives, or other data storage devices. Data storage 108 may additionally store memory tags when the corresponding data pages stored in memory are paged out to the data storage 108. The memory tags can then be loaded from data storage 108 when the associated data pages are paged back into memory.

The communication circuit 110 may be embodied as any type of interface capable of interfacing the compute device 100 with other compute devices, such as over one or more wired or wireless connections. In some embodiments, the communication circuit 110 may be capable of interfacing with any appropriate cable type, such as an electrical cable or an optical cable. The communication circuit 110 may be configured to use any one or more communication technology and associated protocols (e.g., Ethernet, Bluetooth®, WiMAX, near field communication (NFC), etc.). The communication circuit 110 may be located on silicon separate from the processor 102, or the communication circuit 110 may be included in a multi-chip package with the processor 102, or even on the same die as the processor 102. The communication circuit 110 may be embodied as one or more add-in-boards, daughtercards, network interface cards, controller chips, chipsets, specialized components such as a field-programmable gate array (FPGA) or application-specific integrated circuit (ASIC), or other devices that may be used by the compute device 102 to connect with another compute device. In some embodiments, communication circuit 110 may be embodied as part of a system-on-a-chip (SoC) that includes one or more processors, or included on a multichip package that also contains one or more processors. In some embodiments, the communication circuit 110 may include a local processor (not shown) and/or a local memory (not shown) that are both local to the communication circuit 110. In such embodiments, the local processor of the communication circuit 110 may be capable of performing one or more of the functions of the processor 102 described herein. Additionally or alternatively, in such embodiments, the local memory of the communication circuit 110 may be integrated into one or more components of the compute device 102 at the board level, socket level, chip level, and/or other levels.

In some embodiments, the compute device 100 may include other or additional components, such as those commonly found in a compute device. For example, the compute device 100 may also have peripheral devices 116, such as a keyboard, a mouse, a speaker, a microphone, a display, a camera, a battery, an external storage device, etc.

Figure 2:
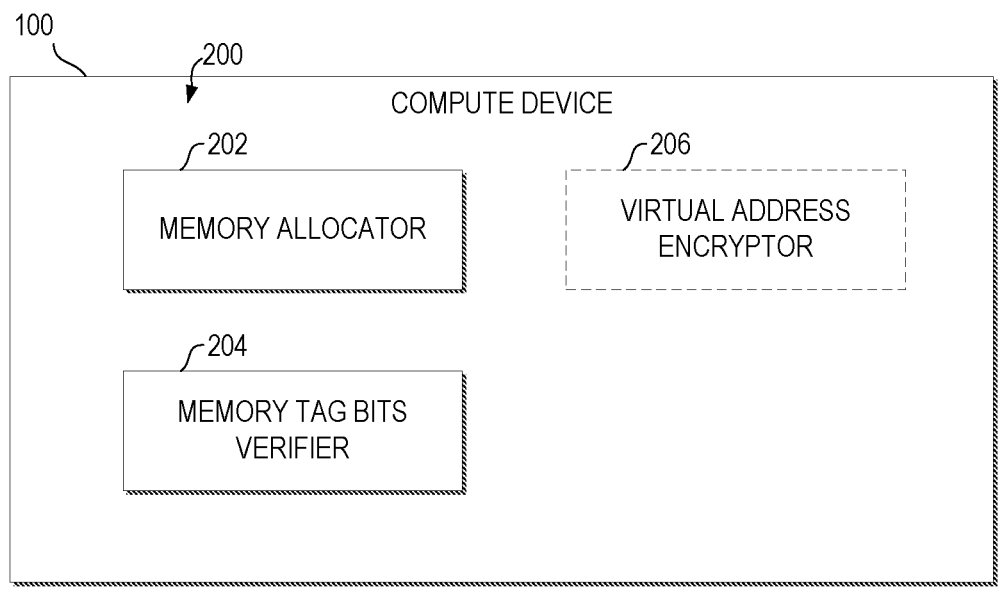
FIG. 2 is a simplified block diagram of at least one embodiment of an environment that may be established by the compute device of FIG. 1.

Referring now to FIG. 2, in an illustrative embodiment, the compute device 100 establishes an environment 200 during operation. The illustrative environment 200 includes a memory allocator 202, a memory tag bits verifier 204, and a virtual address encryptor 206. The various modules of the environment 200 may be embodied as hardware, software, firmware, or a combination thereof. For example, the various modules, logic, and other components of the environment 200 may form a portion of, or otherwise be established by, the processor 102 or other hardware components of the compute device 100 such as the memory 104, the data storage 108, etc. As such, in some embodiments, one or more of the modules of the environment 200 may be embodied as circuitry or collection of electrical devices (e.g., memory allocator circuitry 202, memory tag bits verifier circuitry 204, and virtual address encryptor circuitry 206, etc.). It should be appreciated that, in such embodiments, one or more of the circuits (e.g., the memory allocator circuitry 202, the memory tag bits verifier circuitry 204, and the virtual address encryptor circuitry 206, etc.) may form a portion of one or more of the processor 102, the memory 104, the I/O subsystem 106, the data storage 108, and/or other components of the compute device 100. For example, in some embodiments, some of the modules may be partially or completely implemented by the processor 102 and/or the memory 104. In some embodiments, some or all of the modules may be embodied as the processor 102 as well as the memory 104 and/or data storage 108 storing instructions to be executed by the processor 102. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 102 or other components of the compute device 200. It should be appreciated that some of the functionality of one or more of the modules of the environment 200 may require a hardware implementation, in which case embodiments of modules that implement such functionality will be embodied at least partially as hardware.

The memory allocator 202 is configured to allocate memory as requested by processes running on the compute device 100. Some or all of the memory allocator 202 may be implemented by an operating system of the compute device 100, the MMU 114, the memory 104, other hardware, firmware, software, virtualized hardware, emulated architecture, and/or a combination thereof. In some embodiments, the memory allocator 202 may be referred to or be embodied as a head manager. The memory allocator 202 may receive memory allocation operations from a process running on a core 112 of the processor 102. The memory allocation operation may include, e.g., an amount of memory space to allocate.

The memory allocator 202 may allocate the requested memory. As part of performing the memory allocation, the memory allocator 202 selects virtual memory address tag bit locations. In the illustrative embodiment, 48 bits of the virtual address are translated by paging to identify a physical memory location, and 16 bits are eligible to be selected as virtual memory address tag bit locations, with 4 of the 16 bits being selected. For example, in one embodiment, the compute device 100 may select bits 63, 60, 54, and 52 as the locations of the virtual memory address tag bits. In other embodiments, more or fewer bits of the virtual address may be used to identify a physical memory location, and more or few bits may be eligible to be selected as virtual memory address tag bit locations. For example, in some embodiments, 57 bits may be used to identify a physical memory location, and 7 bits are eligible to be selected as virtual memory address tag bit locations.

The memory allocator 202 may use any suitable approach to select the virtual memory address tag bit locations, such as using a random or pseudo-random number generator, using a secret key, etc. In the illustrative embodiments, virtual memory address bit locations that are not selected are set to zero. In some embodiments, the memory allocator 202 may also write memory tag bits to one or more virtual memory address bit locations that are not selected, such as a bit pattern that depends on the page table entry 322 corresponding to the virtual memory address. In this way, the 16 virtual address bits not used for memory addressing may be partitioned into tag bits that are looked up and compared with tags in memory for each granule of data, and a portion that is compared per page against the pattern stored in the page table entry and cached in TLBs.

In some embodiments, a set of virtual memory address tag bit locations larger than the minimum required to specify the total number of distinct tag values that are stored in memory for each data granule may be used. For example, even if just four tag bits are stored in memory for each granule of data, an embodiment may use sixteen virtual memory address tag bit locations. A structure indexed by each virtual page, e.g., a page table entry (PTE), may specify a mapping to or from a subset of the values that can be encoded in the virtual memory address tag bits to the smaller set of tag values that can be stored in memory. Any value that can be encoded in the virtual memory address tag bits that does not have a mapping to a tag value may be considered invalid. For example, an attempt to access a pointer with an invalid value encoded in the virtual memory address tag bits may cause the processor to generate an exception.

Particularly compact in-memory encodings for tag mapping information are possible when no duplicate expanded tag values are needed. That allows an arbitrary mapping from expanded tag values to per-granule, compact tag values. For example, consider the set of all possible ways of choosing k valid expanded tag values from a total set of n possible expanded tag values, where k is the number of per-granule tag values that can be distinguished based on available per-granule metadata storage. That set is fixed and known in advance for each combination of k and n. Thus, the tag mapping entry need only identify a numbered entry within that set, which the processor can then expand into a representation in the TLB that facilitates efficient expansions from per-granule metadata to expected tag values. For example, consider $k=2^4$ and $n=2^{16}$. The tag mapping can be expressed as an index into the set of all possible choices using just 212 bits (the binomial coefficient "$2^{16}$ choose $2^4$"), which is a substantial reduction compared to the 256-bit representation of a 16-bit expanded tag value for each of the 16 possible per-granule stored tag values.

For sufficiently small sets of this sort, the index into the set could fit directly within the PTE. For allocations spanning multiple pages, the virtual memory address tag value needs to be valid across any page boundaries that the allocation spans. However, it does not need to map to the same tag value stored in memory for every page. The allocator can treat this as a new constraint when considering potential storage ranges. If all pages in the range have some common virtual memory address tag value that is also not used by adjacent allocations already present in those pages, then the allocator may use that range for the current allocation request. Otherwise, the allocator may consider a different storage range. The tag mapping for a page can be changed between the lifetimes of each set of allocations that use that page, i.e., such that there are no valid allocations on that page at the time its tag mapping is updated, to further strengthen memory safety checks. For example, the tag mapping may be updated to avoid mapping virtual memory address tag values that were recently mapped to strengthen temporal safety mitigation. Another example is that the tag mapping may be updated randomly to make it more unpredictable for adversaries attempting to forge tags. Even if some allocations are still valid on a page, mappings for virtual memory address tag values that are not in use by any of those valid allocations may still be modified The mapping between a smaller and a larger tag representation may be performed in a portion of the processor 102 that issues memory requests to caches, in a memory controller that loads tag values from memory and converts them into a larger tag representation that accompanies each cacheline, or in some other portion of the system. Some embodiments may use an instruction, e.g., MapTag, to update a tag mapping for a specified physical region of memory, and that instruction may cause the processor 102 to issue a request to a memory controller to update the tag mapping in registers, caches, and/or memory. MapTag may be a serializing instruction so that subsequent memory accesses observe the updated tag mapping. Some embodiments may also use an instruction, e.g., LoadTagMap, to read a tag mapping for a specified physical region of memory, e.g., for the purposes of associating that tag mapping with a corresponding swapped-out page, and that instruction may cause the processor 102 to issue a request to a memory controller to read the tag mapping from registers, caches, and/or memory.

Allocators may update tag mappings when there are no valid allocations on the affected page, or they may update mappings for tags that are not in use by any valid allocations on the page. Allocators may clear sensitive data from allocations prior to updating corresponding tag mappings. If larger tag representations are stored alongside data in cachelines, then dirty tag values (i.e., tag values that have been updated after they were first loaded into cache from memory) may result in arbitrary values being stored to memory. Allocators may subsequently update tag values for that memory when assigning that memory to allocations. If multiple allocator software threads may perform tag updates on the same page, then those threads may synchronize so that each thread only uses tag values that are currently valid for that page. If MapTag is serializing, then it may be adequate for the allocator to use per-page semaphores for synchronization. Allocators may assign per-thread page pools to avoid synchronization overheads. MapTag may update accessed and dirty bits for specified pages so that virtual machine live migration may migrate the updated tag mapping.

As part of allocating memory, the memory allocator 202 writes the virtual memory address tag bit locations to a page table entry 322 corresponding to the virtual memory address (see below in regard to FIGS. 3 and 4). In the illustrative embodiment, the memory allocator 202 writes page tag bits 404 that indicate the virtual memory address tag bit locations. In embodiments in which the compute device 100 also writes memory tag bits to one or more virtual memory address bit locations that are not selected, the memory allocator 202 writes indications of those memory tag bits to the page tag bits 404 of the page table entry 322. The memory allocator 202 also selects values for the memory tag bits for the memory 104 and writes the memory tag bits in the memory 104. An alternative to including in each PTE the information about virtual memory address tag bit locations and/or mappings from virtual memory address tag values to values to be compared against stored tags would be to have a separate table indexed by physical data addresses that specifies that information. That would avoid the need for duplicating that information across aliases of the same underlying physical page. It would also alleviate pressure on limited PTE bits.

When all data is freed on a page, the memory allocation 202 can change the PTE invalid set hash value to break a use-after-free (UAF) chain preventing adversary from hanging on to a freed pointer until tag value is reused.

The memory tag bits verifier 204 is configured to verify whether the memory tag bits of a virtual address of a memory operation are valid. Some or all of the memory tag bits verifier 204 may be implemented by an operating system of the compute device 100, the MMU 114, the memory 104, other hardware, firmware, software, virtualized hardware, emulated architecture, and/or a combination thereof. When a core 112 of the processor 102 receives a memory read/write operation with a virtual memory address, the virtual memory address is passed to the memory tag bits verifier 204. In some cases, the virtual address encryptor 206 may decrypt some or all of the virtual memory address using a secret key and use the immutable base address bits 506 as a cryptographic tweak as part of the decryption (for example, using a tweakable block cipher or mode).

The memory tag bits verifier 204 accesses a page table entry 322 corresponding to the virtual memory address. In the illustrative embodiment, the memory tag bits verifier 204 performs a page walk to load the page table entry from memory 104 to the processor 102. In some cases, in block 626, the memory tag bits verifier 204 can access the page table entry 322 stored in the TLB 116.

The memory tag bits verifier 204 determines the virtual memory address bit locations to be used as the memory tag bits to be sent to the memory 104 by accessing the page table entry cached in the TLB. The memory tag bits verifier 204 compares the memory tag bits in the virtual memory address to the page tag bits 404 in the page table entry 322 cached in the TLB. In one embodiment, the page tag bits 404 indicate which of the four virtual memory address bit locations are to be used as the memory tag bits to be sent to the memory 104. Those bits may be a zero or a one, but the other 12 upper virtual memory address bits should all be zero. In other embodiments, the page tag bits 404 may indicate a different set of values for the other 12 upper virtual memory address bits, such as a set of values stored in page tag bits 404 in the page table entry 322, copies of the most significant virtual address bits, the virtual memory address, a secret key, etc. If the tag bits do not match, the memory tag bits verifier 204 aborts the memory operation. The memory tag bits verifier 204 may throw an exception, log an error, and/or the like in response to the tag bits not matching. If the tag bits do match, the memory tag bits verifier 204 accesses the physical memory address. In the illustrative embodiment, the memory tag bits verifier 204 accesses memory tag bits stored in the memory 104 or locally cached in an object cache corresponding to the physical memory address. If the memory tag bits in the memory 104 do not match, the memory tag bits verifier 204 aborts the memory operation. If the memory tag bits do match, memory tag bits verifier 204 allows the memory operation to proceed.

The virtual address encryptor 206 is configured to encrypt some or all of a virtual memory address. Some or all of the virtual address encryptor 206 may be implemented by an operating system of the compute device 100, the MMU 114, the memory 104, other hardware, firmware, software, virtualized hardware, emulated architecture, and/or a combination thereof.

In some embodiments, the virtual address encryptor 206 optionally encrypts some or all of a virtual memory address as it is allocated. If the memory address pointer is encrypted, then an adversary observing their own pointer will not be able to know valid tag values for other pointers, even for memory allocations on the same page and, thus, will not be able to forge pointers for other allocations. In one embodiment, metadata bits 502 are used as a size field that determines the power-of-two that matches the allocation (see FIG. 5). This determines the number of modifiable lower address bits 508 that can be used for pointer arithmetic. The remaining immutable base address bits 506 are then used as a tweak to encrypt the tag value using a secret key and a tweakable block cipher or mode. The size can also be included in the tweak to disambiguate addresses of different sizes that have otherwise identical tweak bit values, i.e., to disambiguate addresses with relatively more immutable bits that have those bits set to zero from addresses with relatively fewer immutable bits assuming that the other bit positions are zeroed out. Such an approach both hides the tag value from an adversary and makes the tag value dependent on the size and location of the allocation, thus preventing pointer forgery.

Figure 3:
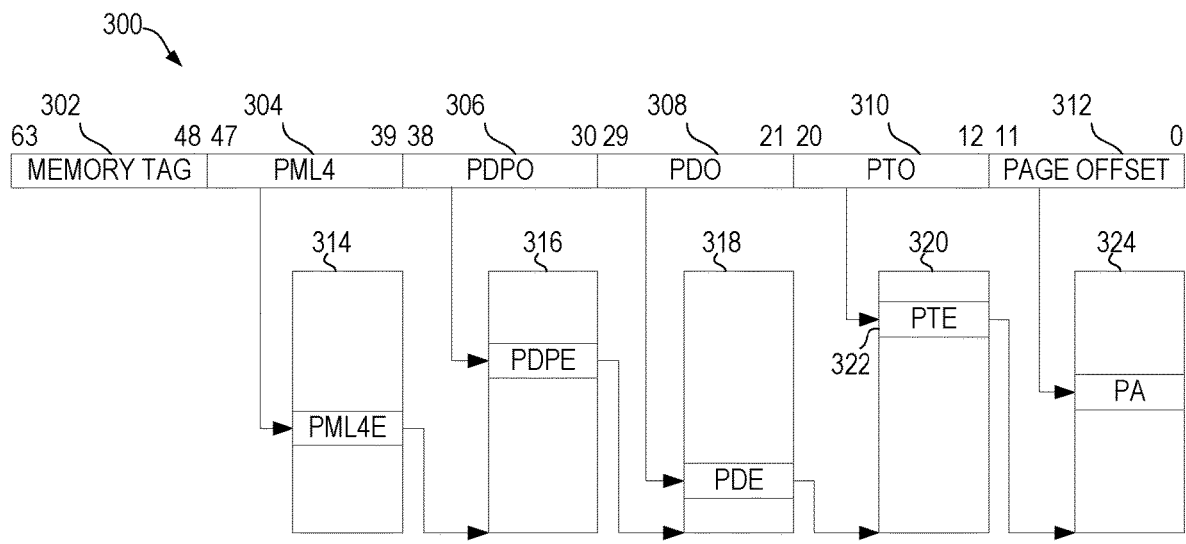
FIG. 3 is a simplified diagram showing how a virtual memory address is used to identify a page table entry and a physical memory address.

Referring now to FIG. 3, in one embodiment, a virtual memory address 300 has 64 bits, which are split into different sections. In other embodiments, a virtual memory address 300 may have any suitable number of bits, such as 32-128. In the illustrative embodiment, memory tag bits 302 are the upper 16 bits, from bit 48 to bit 63. Next, bits 47 to 39 indicate the page map level 4 (PML4) offset 304. Bits 38 to 30 indicate the page directory pointer offset (PDPO) 306. Bits 29 to 21 indicate the page directory offset (PDO), and bits 20 to 12 indicate the page table offset (PTO) 310. Finally, bits 11 to 0 are the page offset 312. In use, some or all of the memory tag bits 302 are used to check whether a memory operation at the virtual memory address 300 should be allowed. The PML4 bits 304 are used to select an entry in a page map level 4 table 314. The entry in the page map level 4 table 314 is used to select a page pointers directory table 316, and the PDPO 306 is used to select an entry in the page pointers directory table 316. The entry in the page pointers directory table 406 is used to select a page directory table 318, and the PDO 308 is used to select a page directory entry in the page directory table 318. The entry in the page directory table 318 is used to select a page table 320, and the PTO 310 is used to select a page table entry 322. The page table entry 322 and the page offset 312 are used to determine a physical address in the memory 324.

Figure 4:
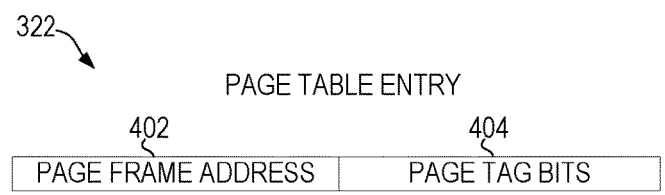
FIG. 4 is a simplified diagram showing a page table entry.

Referring now to FIG. 4, in one embodiment, a page table entry 322 includes a page frame address 402 that is used to determine part of the physical memory address as well as page tag bits 404. In the illustrative embodiment, page tag bits 404 indicate which bits of the memory tag 302 of the virtual memory address 300 should be passed along to memory 104 to check whether the page tag bits in the memory 104 match those in the virtual memory address 300. In the illustrative embodiment, the remaining 12 bits of the memory tag 302 are set to zero. Additionally or alternatively, in some embodiments, the page tag bits 404 may indicate a value for some or all of the bits of the memory tag 402. For example, the page tag bits 404 may indicate a pattern that the 12 bits that will not be passed to the memory 104 should have, which may depend on, e.g., some or all of the virtual memory address 300, the page table entry 322, a secret key, etc. In the illustrative embodiment, the page tag bits 404 apply to all virtual memory addresses of the page. In other embodiments, different page tag bits 404 may apply to different parts of the page. For example, the first half of a page may use a first set of the page tag bits 404, and the second half of the page may use a second set of the page tag bits 404 where both sets of page tag bits are indicated in the page table entry 322. In the illustrative embodiment, each page table entry 322 corresponds to a page with a size of 4,096 bytes. In other embodiments, pages may be different sizes, such as 512-8,192 bytes.

Figure 5:
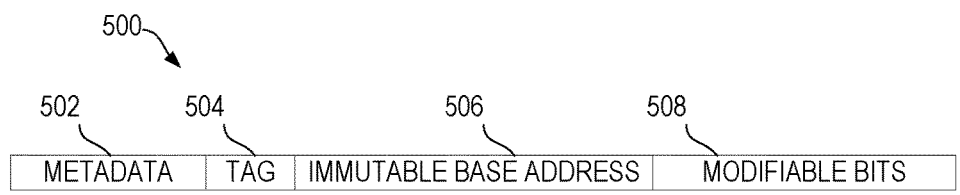
FIG. 5 is a simplified diagram showing a virtual memory address that is partially encrypted.

Referring now to FIG. 5, in one embodiment, an encrypted virtual memory address 500 includes metadata 502, tag bits 504, immutable base address 506, and modifiable bits 508. In one embodiment, metadata bits 502 are used as a size field that determines the power-of-two that best fits the allocation. This determines the number of modifiable lower address bits 508 that can be used for pointer arithmetic. The immutable base address bits 506 are then used as a tweak to encrypt the tag value using a secret key and a tweakable block cipher. Such an approach both hides the tag value from an adversary and makes the tag value dependent on the size and location of the allocation. It should be appreciated that the division of bits of the virtual memory address 500 shown in FIG. 5 is merely one possible embodiment, and that other divisions may be used, such as where the virtual memory address 500 only contains the tag value and memory address.

Figure 6:
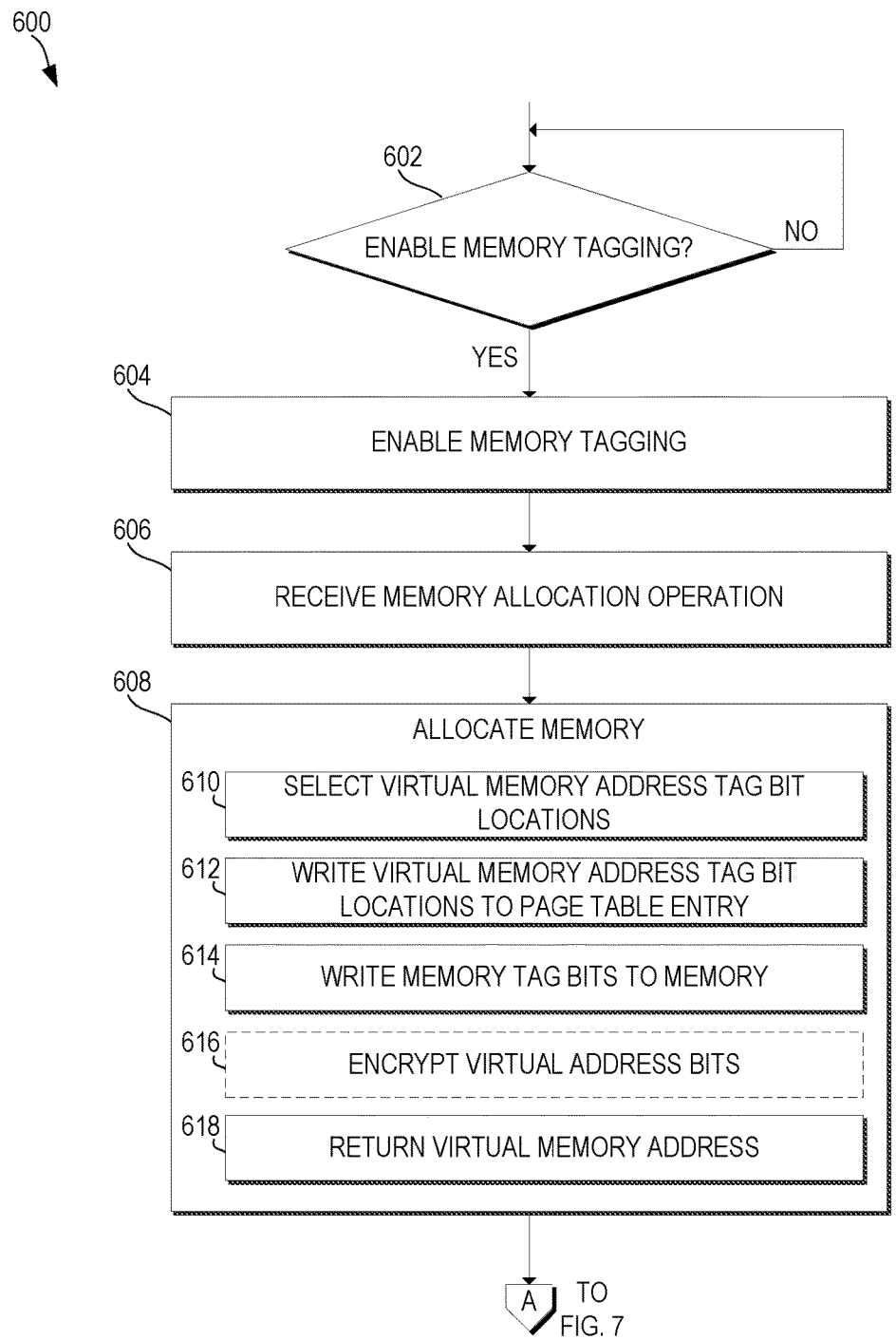
FIGS. 6 and 7 are a simplified flow diagram of at least one embodiment of a method for using memory tags to mitigate memory safety bugs that may be executed by the compute device of FIG. 1.

Referring now to FIG. 6, in use, the compute device 100 may execute a method 600 for performing memory operations with memory tag bits. The method 600 may be executed by any suitable component or combination of components of the compute device 100, including hardware, software, firmware, etc. For example, some or all of the method 600 may be performed by the processor 102 (the core 112, the MMU 114, the TLB 116, etc.), the memory 104, and/or the operating system of the compute device 100.

The method 600 begins in block 602, in which the compute device 100 determines whether to enable memory tagging. The compute device 100 may enable memory tagging based on a setting of the operating system, a user setting, a security setting, a hardware setting, a message from a remote compute device, and/or the like. If the compute device 100 is not to enable memory tagging, the method 600 loops back to block 602 to continue operation without memory tagging.

If the compute device 100 is to enable memory tagging, the method 600 proceeds to block 604, in which the compute device 100 enables memory tagging. Memory tagging may be enabled for some or all of the processes running on the compute device 100.

In block 606, the compute device receives a memory allocation operation from a process running on a core 112 of the processor 102. The memory allocation operation may include, e.g., an amount of memory space to allocate.

In block 608, the compute device 100 allocates the requested memory. In block 610, the compute device 100 selects virtual memory address tag bit locations. The compute device 100 will choose pointer tags on a memory allocation that are valid for the current page mapping containing the allocation specified by the tag group in the page table entry for the page containing the allocation. In the illustrative embodiment, 48 bits of the virtual address are used to identify a physical memory location, and 16 bits are eligible to be selected as virtual memory address tag bit locations, with 4 of the 16 bits being selected. For example, in one embodiment, the compute device 100 may select bits 63, 60, 54, and 52 as the locations of the virtual memory address tag bits. In other embodiments, more or fewer bits of the virtual address may be used to identify a physical memory location, and more or few bits may be eligible to be selected as virtual memory address tag bit locations. For example, in some embodiments, 57 bits may be used to identify a physical memory location, and 7 bits are eligible to be selected as virtual memory address tag bit locations. The compute device 100 may use any suitable approach to select the virtual memory address tag bit locations, such as using a random or pseudo-random number generator, using a secret key, etc. In the illustrative embodiments, virtual memory address bit locations that are not selected are set to zero. In some embodiments, the compute device 100 may also write memory tag bits to one or more virtual memory address bit locations that are not selected, such as a bit pattern that depends on the page table entry 322 corresponding to the virtual memory address.

In block 612, if necessary, the compute device 100 writes the virtual memory address tag bit locations to the page table entry 322 corresponding to the virtual memory address. The compute device 100 may set the valid memory tag or set of adjacent tags for the full extent of the allocation in the memory tag table. In the illustrative embodiment, the compute device 100 writes page tag bits 404 that indicate the virtual memory address tag bit locations and values. In embodiments in which the compute device 100 also writes memory tag bits to one or more virtual memory address bit locations that are not selected, indications of those memory tag bits may also be written to the page tag bits 404 of the page table entry 322. If an allocation is to cross multiple pages, either the compute device 100 should align all possible values to be the same across pages, or choose overlapping values (that is, adjacent pages may share some tag values based on the tag group, tag groups can ensure adjacent pages share a few tags in common). The compute device 100 can group small allocations to minimize page crossing allocations.

In some embodiments, the compute device 100 may determine page tag bits 404 by a calculation using a secret value known to the memory allocator and operating system. In this case, the extended tag value may be prewritten to the page table entry by the operating system for that page based on the virtual/linear address and a secret key or translation. In this way, the memory allocator and the OS can be synchronized so that the memory allocator can calculate or otherwise predict what extended tag value was set by the OS when creating the page table entry for the same linear address translation. The memory allocator would then use this bit pattern (and the correct memory tag) in the virtual/linear address returned to the program on allocation. In this way, there is just a one-time communication between the operating system and memory allocator to determine the secret transformation using the linear address of a page used to determine the extended tag bit pattern stored in the PTEs for that page. In some embodiments, this transformation may be performed automatically in hardware such that tag bit patterns need not be stored per page but simply calculated for a given linear address and process/context.

In block 614, the compute device 100 selects values for the memory tag bits for the memory 104 and writes the memory tag bits in the memory 104.

In some embodiments, the compute device 100 optionally encrypts some or all of the virtual memory address pointer. If the memory address pointer is encrypted, then an adversary observing their own pointer will not be able to know valid tag values for other pointers, even for memory allocations on the same page. In one embodiment, metadata bits 502 are used as a size field that determines the power-of-two that matches the allocation. This determines the number of modifiable lower address bits 508 that can be used for pointer arithmetic. The immutable base address bits 506 are then used as a tweak to encrypt the tag value using a secret key and a tweakable block cipher. Such an approach both hides the tag value from an adversary and makes the tag value dependent on the size and location of the allocation.

In block 618, the virtual memory address is returned to the process that requested the memory allocation.

In the illustrative embodiment, the MMU 114 is instructed by the operating system to allocate the memory, and the MMU 114 is responsible for selecting the virtual memory address tag bit locations, writing the virtual memory address tag bit locations to the page table entry 322, and sending the memory tag bits to the memory 104. In other embodiments, other components of the compute device 100 may perform some or all of that function. For example, the operating system may select virtual memory address tag bit locations and write the virtual memory address tag bit locations to the page table entry 300, the memory 104 may determine the memory tag bits stored in memory 104, etc. In general, any suitable hardware, software, or firmware may perform any suitable function of initializing the memory tag bits.

Figure 7:
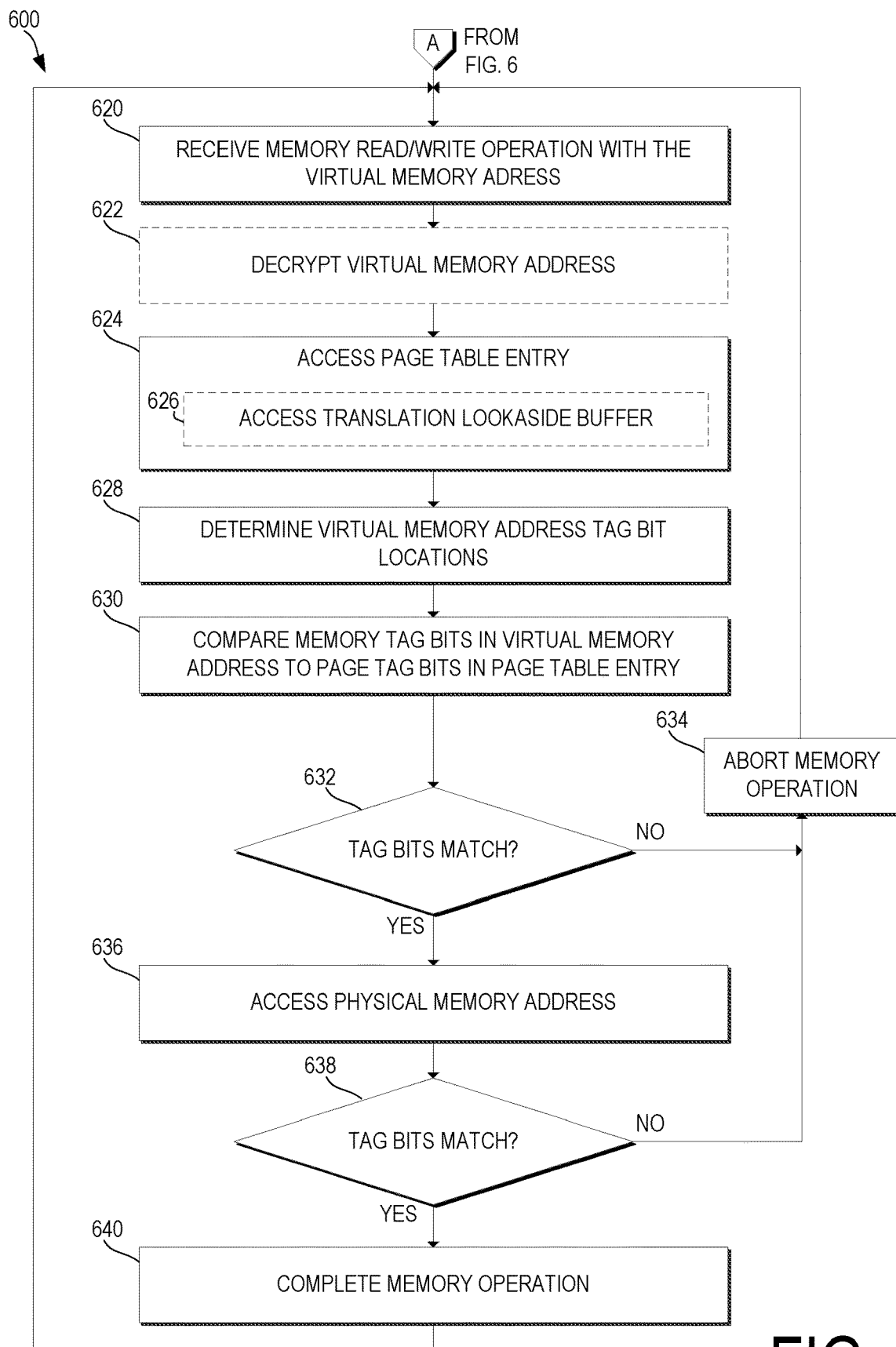

Referring now to FIG. 7, in block 620, the compute device 100 receives a memory load/store operation with the virtual memory address. For example, the core 112 may access the next instruction in a program, which may be an instruction to read or write to the virtual memory address.

In block 622, in some embodiments, the compute device 100 optionally decrypts the virtual memory address or a portion thereof. In one embodiment, the compute device 100 decrypts part of the memory address using a secret key and immutable base address bits 506.

In block 624, the MMU 114 access a page table entry 322 corresponding to the virtual memory address. In the illustrative embodiment, the MMU 114 performs a page walk to load the page table entry from memory 104 to the processor 102. In some cases, in block 626, the MMU 114 can access the page table entry 322 stored in the TLB 116.

In block 628, the MMU 114 determines the virtual memory address bit locations to be used as the memory tag bits to be sent to the memory 104 by accessing the page table entry. In block 630, the MMU 114 compares the memory tag bits in the virtual memory address to the page tag bits 404 in the page table entry 322. In one embodiment, the page tag bits 404 indicate which of the four virtual memory address bit locations are to be used as the memory tag bits to be sent to the memory 104. Those bits may be a zero or a one, but the other 12 upper virtual memory address bits should all be zero or other fixed value. In other embodiments, the page tag bits 404 may indicate a different set of values for the other 12 upper virtual memory address bits, such as a set of values stored in page tag bits 404 in the page table entry 322 for that page, the virtual memory address, a secret key, etc. In other words, the remaining 12 bits may be used as an extended tag that are to match the extended tag value stored per page in the page table entry 322.

In block 632, if the tag bits do not match, the method 600 proceeds to block 634, in which the memory operation is aborted. The compute device 100 may throw an exception, log an error, and/or the like in response to the tag bits not matching.

In block 632, if the tag bits do match, the method 600 proceeds to block 636, in which the physical memory address is accessed. In the illustrative embodiment, the memory 104 accesses memory tag bits stored in the memory 104 corresponding to the physical memory address. In block 638, if the memory tag bits do not match, the method 600 proceeds to block 634, in which the memory operation is aborted. If the memory tag bits do match, the method 600 proceeds to block 640 to complete the memory operation. The method 600 then loops back to block 620 to wait for another memory operation.

EXAMPLES

Illustrative examples of the technologies disclosed herein are provided below. An embodiment of the technologies may include any one or more, and any combination of, the examples described below.

Example 1 includes a processor comprising a processor core to receive a read or write memory operation comprising a virtual memory address, wherein the virtual memory address comprises a plurality of memory tag bits; and a memory management unit (MMU) to access a page table entry based on the virtual memory address, wherein the page table entry comprises a plurality of page tag bits; and determine whether to abort the read or write memory operation based on a comparison between the plurality of page tag bits to the plurality of memory tag bits.

Example 2 includes the subject matter of Example 1, and wherein the MMU is further to select one or more of the plurality of memory tag bits based on the plurality of page tag bits; and send the read or write memory operation to a memory connected to the processor with the one or more selected bits of the plurality of memory tag bits.

Example 3 includes the subject matter of any of Examples 1 and 2, and wherein the plurality of memory tag bits comprises sixteen memory tag bits, wherein to select one or more of the plurality of memory tag bits comprises to select four memory tag bits.

Example 4 includes the subject matter of any of Examples 1-3, and wherein the MMU is further to determine whether memory tag bits of the plurality of memory tag bits other than the selected one or more memory tag bits are correct values.

Example 5 includes the subject matter of any of Examples 1-4, and wherein to determine whether memory tag bits of the plurality of memory tag bits other than the selected one or more memory tag bits are correct values comprises to determine whether memory tag bits of the plurality of memory tag bits other than the selected one or more memory tag bits are all zero.

Example 6 includes the subject matter of any of Examples 1-5, and wherein the MMU is further to determine a pattern of bits based on the plurality of page tag bits, a secret key, the virtual memory address, or any combination thereof, wherein to determine whether memory tag bits of the plurality of memory tag bits other than the selected one or more memory tag bits are correct values comprises to compare memory tag bits of the plurality of memory tag bits other than the selected one or more memory tag bits to the pattern of bits.

Example 7 includes the subject matter of any of Examples 1-6, and wherein the MMU is further to abort the memory operation in response to a determination that the memory tag bits of the plurality of memory tag bits other than the selected one or more memory tag bits are not correct values; and send the memory operation to a memory connected to the processor in response to a determination that the memory tag bits of the plurality of memory tag bits other than the selected one or more memory tag bits are correct values.

Example 8 includes the subject matter of any of Examples 1-7, and wherein the MMU is to receive a memory allocation request prior to receipt of the read or write memory operation; assign the virtual memory address based on the memory allocation request; determine values for the plurality of page tag bits; write the determined values for the plurality of page tag bits to the page table entry; and return the virtual memory address in response to receipt of the memory allocation request.

Example 9 includes the subject matter of any of Examples 1-8, and wherein the MMU is further to encrypt at least part of the virtual memory address before return of the virtual memory address.

Example 10 includes the subject matter of any of Examples 1-9, and wherein to determine values for the plurality of page tag bits comprises to receive values from an operating system associated with the processor.

Example 11 includes the subject matter of any of Examples 1-10, and wherein to determine values for the plurality of page tag bits comprises to determine values based on a random or pseudo-random number generator.

Example 12 includes the subject matter of any of Examples 1-11, and wherein to access the page table entry comprises to access the page table entry in a translation lookaside buffer (TLB).

Example 13 includes a compute device comprising a processor; and a memory coupled to the processor, the processor to receive a read or write memory operation comprising a virtual memory address, wherein the virtual memory address comprises a plurality of memory tag bits; access a page table entry based on the virtual memory address, wherein the page table entry comprises a plurality of page tag bits; and determine whether to abort the read or write memory operation based on a comparison between the plurality of page tag bits to the plurality of memory tag bits.

Example 14 includes the subject matter of Example 13, and wherein the processor is further to select one or more of the plurality of memory tag bits based on the plurality of page tag bits; and send the read or write memory operation to the memory with the one or more selected bits of the plurality of memory tag bits.

Example 15 includes the subject matter of any of Examples 13 and 14, and wherein the memory is to compare the one or more selected bits with a plurality of memory tag bits stored in the memory; and determine whether to abort the read or write memory operation based on the comparison between the one or more selected bits to the plurality of memory tag bits stored in the memory.

Example 16 includes the subject matter of any of Examples 13-15, and wherein the plurality of memory tag bits comprises sixteen memory tag bits, wherein to select one or more of the plurality of memory tag bits comprises to select four memory tag bits.

Example 17 includes the subject matter of any of Examples 13-16, and wherein the processor is further to determine whether memory tag bits of the plurality of memory tag bits other than the selected one or more memory tag bits are correct values.

Example 18 includes the subject matter of any of Examples 13-17, and wherein to determine whether memory tag bits of the plurality of memory tag bits other than the selected one or more memory tag bits are correct values comprises to determine whether memory tag bits of the plurality of memory tag bits other than the selected one or more memory tag bits are all zero.

Example 19 includes the subject matter of any of Examples 13-18, and wherein the processor is further to determine a pattern of bits based on the plurality of page tag bits, a secret key, the virtual memory address, or any combination thereof, wherein to determine whether memory tag bits of the plurality of memory tag bits other than the selected one or more memory tag bits are correct values comprises to compare memory tag bits of the plurality of memory tag bits other than the selected one or more memory tag bits to the pattern of bits.

Example 20 includes the subject matter of any of Examples 13-19, and wherein the processor is further to abort the memory operation in response to a determination that the memory tag bits of the plurality of memory tag bits other than the selected one or more memory tag bits are not correct values; and send the memory operation to the memory in response to a determination that the memory tag bits of the plurality of memory tag bits other than the selected one or more memory tag bits are correct values.

Example 21 includes the subject matter of any of Examples 13-20, and wherein the processor is to receive a memory allocation request prior to receipt of the read or write memory operation; assign the virtual memory address based on the memory allocation request; determine values for the plurality of page tag bits; write the determined values for the plurality of page tag bits to the page table entry; and return the virtual memory address in response to receipt of the memory allocation request.

Example 22 includes the subject matter of any of Examples 13-21, and wherein the processor is further to encrypt at least part of the virtual memory address before return of the virtual memory address.

Example 23 includes the subject matter of any of Examples 13-22, and wherein to determine values for the plurality of page tag bits comprises to receive values from an operating system associated with the processor.

Example 24 includes the subject matter of any of Examples 13-23, and wherein to determine values for the plurality of page tag bits comprises to determine values based on a random or pseudo-random number generator.

Example 25 includes the subject matter of any of Examples 13-24, and wherein to access the page table entry comprises to access the page table entry in a translation lookaside buffer (TLB).

Example 26 includes a processor comprising means for receiving a read or write memory operation comprising a virtual memory address, wherein the virtual memory address comprises a plurality of memory tag bits; means for accessing a page table entry based on the virtual memory address, wherein the page table entry comprises a plurality of page tag bits; and means for determining whether to abort the read or write memory operation based on a comparison between the plurality of page tag bits to the plurality of memory tag bits.

Example 27 includes the subject matter of Example 26, and wherein the processor further comprises means for selecting one or more of the plurality of memory tag bits based on the plurality of page tag bits; and means for sending the read or write memory operation to a memory connected to the processor with the one or more selected bits of the plurality of memory tag bits.

Example 28 includes the subject matter of any of Examples 26 and 27, and wherein the plurality of memory tag bits comprises sixteen memory tag bits, wherein the means for selecting one or more of the plurality of memory tag bits comprises means for selecting four memory tag bits.

Example 29 includes the subject matter of any of Examples 26-28, and further including means for determining whether memory tag bits of the plurality of memory tag bits other than the selected one or more memory tag bits are correct values.

Example 30 includes the subject matter of any of Examples 26-29, and wherein the means for determining whether memory tag bits of the plurality of memory tag bits other than the selected one or more memory tag bits are correct values comprises means for determining whether memory tag bits of the plurality of memory tag bits other than the selected one or more memory tag bits are all zero.

Example 31 includes the subject matter of any of Examples 26-30, and further including means for determining a pattern of bits based on the plurality of page tag bits, a secret key, the virtual memory address, or any combination thereof, wherein the means for determining whether memory tag bits of the plurality of memory tag bits other than the selected one or more memory tag bits are correct values comprises means for comparing memory tag bits of the plurality of memory tag bits other than the selected one or more memory tag bits to the pattern of bits.

Example 32 includes the subject matter of any of Examples 26-31, and further including means for aborting the memory operation in response to a determination that the memory tag bits of the plurality of memory tag bits other than the selected one or more memory tag bits are not correct values; and means for sending the memory operation to a memory connected to the processor in response to a determination that the memory tag bits of the plurality of memory tag bits other than the selected one or more memory tag bits are correct values.

Example 33 includes the subject matter of any of Examples 26-32, and further including means for receiving a memory allocation request prior to receipt of the read or write memory operation; means for assigning the virtual memory address based on the memory allocation request; means for determining values for the plurality of page tag bits; means for writing the determined values for the plurality of page tag bits to the page table entry; and means for returning the virtual memory address in response to receipt of the memory allocation request.

Example 34 includes the subject matter of any of Examples 26-33, and further including means for encrypting at least part of the virtual memory address before return of the virtual memory address.

Example 35 includes the subject matter of any of Examples 26-34, and wherein the means for determining values for the plurality of page tag bits comprises means for receiving values from an operating system associated with the processor.

Example 36 includes the subject matter of any of Examples 26-35, and wherein the means for determining values for the plurality of page tag bits comprises means for determining values based on a random or pseudo-random number generator.

Example 37 includes the subject matter of any of Examples 26-36, and wherein the means for accessing the page table entry comprises means for accessing the page table entry in a translation lookaside buffer (TLB).

Example 38 includes a method comprising receiving, by a processor core of a processor, a read or write memory operation comprising a virtual memory address, wherein the virtual memory address comprises a plurality of memory tag bits; accessing, by a memory management unit (MMU) of the processor, a page table entry based on the virtual memory address, wherein the page table entry comprises a plurality of page tag bits; and determining, by the MMU, whether to abort the read or write memory operation based on a comparison between the plurality of page tag bits to the plurality of memory tag bits.

Example 39 includes the subject matter of Example 38, and further including selecting, by the MMU, one or more of the plurality of memory tag bits based on the plurality of page tag bits; and sending, by the MMU the read or write memory operation to a memory connected to the processor with the one or more selected bits of the plurality of memory tag bits.

Example 40 includes the subject matter of any of Examples 38 and 39, and wherein the plurality of memory tag bits comprises sixteen memory tag bits, wherein selecting one or more of the plurality of memory tag bits comprises selecting four memory tag bits.

Example 41 includes the subject matter of any of Examples 38-40, and further including determining whether memory tag bits of the plurality of memory tag bits other than the selected one or more memory tag bits are correct values.

Example 42 includes the subject matter of any of Examples 38-41, and wherein determining whether memory tag bits of the plurality of memory tag bits other than the selected one or more memory tag bits are correct values comprises determining whether memory tag bits of the plurality of memory tag bits other than the selected one or more memory tag bits are all zero.

Example 43 includes the subject matter of any of Examples 38-42, and further including determining, by the MMU a pattern of bits based on the plurality of page tag bits, a secret key, the virtual memory address, or any combination thereof, wherein determining whether memory tag bits of the plurality of memory tag bits other than the selected one or more memory tag bits are correct values comprises comparing memory tag bits of the plurality of memory tag bits other than the selected one or more memory tag bits to the pattern of bits.

Example 44 includes the subject matter of any of Examples 38-43, and further including aborting, by the MMU, the memory operation in response to a determination that the memory tag bits of the plurality of memory tag bits other than the selected one or more memory tag bits are not correct values; and sending, by the MMU, the memory operation to a memory connected to the processor in response to a determination that the memory tag bits of the plurality of memory tag bits other than the selected one or more memory tag bits are correct values.

Example 45 includes the subject matter of any of Examples 38-44, and further including receiving, by the MMU, a memory allocation request prior to receipt of the read or write memory operation; assigning, by the MMU, the virtual memory address based on the memory allocation request; determining, by the MMU, values for the plurality of page tag bits; writing, by the MMU, the determined values for the plurality of page tag bits to the page table entry; and returning, by the MMU, the virtual memory address in response to receipt of the memory allocation request.

Example 46 includes the subject matter of any of Examples 38-45, and further including encrypting, by the MMU, at least part of the virtual memory address before return of the virtual memory address.

Example 47 includes the subject matter of any of Examples 38-46, and wherein determining values for the plurality of page tag bits comprises receiving values from an operating system associated with the processor.

Example 48 includes the subject matter of any of Examples 38-47, and wherein determining values for the plurality of page tag bits comprises determining values based on a random or pseudo-random number generator.

Example 49 includes the subject matter of any of Examples 38-48, and wherein accessing the page table entry comprises accessing the page table entry in a translation lookaside buffer (TLB).

Example 50 includes one or more computer-readable storage media comprising a plurality of instructions stored thereon that, when executed by a processor, causes the processor to receive, by a processor core of the processor, a read or write memory operation comprising a virtual memory address, wherein the virtual memory address comprises a plurality of memory tag bits; access, by memory management unit (MMU) of the processor, a page table entry based on the virtual memory address, wherein the page table entry comprises a plurality of page tag bits; and determine whether to abort the read or write memory operation based on a comparison between the plurality of page tag bits to the plurality of memory tag bits.

Example 51 includes the subject matter of Example 50, and wherein the plurality of instructions further cause the processor to select, by the MMU, one or more of the plurality of memory tag bits based on the plurality of page tag bits; and send, by the MMU, the read or write memory operation to a memory connected to the processor with the one or more selected bits of the plurality of memory tag bits.

Example 52 includes the subject matter of any of Examples 50 and 51, and wherein the plurality of memory tag bits comprises sixteen memory tag bits, wherein to select one or more of the plurality of memory tag bits comprises to select four memory tag bits.

Example 53 includes the subject matter of any of Examples 50-52, and wherein the plurality of instructions further cause the processor to determine, by the MMU, whether memory tag bits of the plurality of memory tag bits other than the selected one or more memory tag bits are correct values.

Example 54 includes the subject matter of any of Examples 50-53, and wherein to determine whether memory tag bits of the plurality of memory tag bits other than the selected one or more memory tag bits are correct values comprises to determine whether memory tag bits of the plurality of memory tag bits other than the selected one or more memory tag bits are all zero.

Example 55 includes the subject matter of any of Examples 50-54, and wherein the plurality of instructions further cause the processor to determine, by the MMU, a pattern of bits based on the plurality of page tag bits, a secret key, the virtual memory address, or any combination thereof, wherein to determine whether memory tag bits of the plurality of memory tag bits other than the selected one or more memory tag bits are correct values comprises to compare memory tag bits of the plurality of memory tag bits other than the selected one or more memory tag bits to the pattern of bits.

Example 56 includes the subject matter of any of Examples 50-55, and wherein the plurality of instructions further cause the processor to abort, by the MMU, the memory operation in response to a determination that the memory tag bits of the plurality of memory tag bits other than the selected one or more memory tag bits are not correct values; and send, by the MMU, the memory operation to a memory connected to the processor in response to a determination that the memory tag bits of the plurality of memory tag bits other than the selected one or more memory tag bits are correct values.

Example 57 includes the subject matter of any of Examples 50-56, and wherein the plurality of instructions further cause the processor to receive, by the MMU, a memory allocation request prior to receipt of the read or write memory operation; assign, by the MMU, the virtual memory address based on the memory allocation request; determine, by the MMU, values for the plurality of page tag bits; write, by the MMU, the determined values for the plurality of page tag bits to the page table entry; and return, by the MMU, the virtual memory address in response to receipt of the memory allocation request.

Example 58 includes the subject matter of any of Examples 50-57, and wherein the plurality of instructions further cause the processor to encrypt, by the MMU, at least part of the virtual memory address before return of the virtual memory address.

Example 59 includes the subject matter of any of Examples 50-58, and wherein to determine values for the plurality of page tag bits comprises to receive values from an operating system associated with the processor.

Example 60 includes the subject matter of any of Examples 50-59, and wherein to determine values for the plurality of page tag bits comprises to determine values based on a random or pseudo-random number generator.

Example 61 includes the subject matter of any of Examples 50-60, and wherein to access the page table entry comprises to access the page table entry in a translation lookaside buffer (TLB) of the processor.

The invention claimed is:

1. A processor comprising:
a processor core to receive a read or write memory operation comprising a virtual memory address, wherein the virtual memory address comprises a plurality of memory tag bits; and
a memory management unit (MMU), the MMU to:
access a page table entry based on the virtual memory address, wherein the page table entry comprises a plurality of page tag bits;
determine whether to abort the read or write memory operation based on a comparison between the plurality of page tag bits to the plurality of memory tag bits;
select one or more of the plurality of memory tag bits based on the plurality of page tag bits using a mapping, wherein the mapping maps one or more inputs to the one or more of the plurality of memory tag bits, wherein the one or more inputs comprises the plurality of page tag bits, wherein, for each of the plurality of memory tag bits, the mapping maps at least one possible combination of the one or more inputs to a selection that includes the corresponding memory tag bit, wherein the one or more selected bits of the plurality of memory tag bits is fewer bits than the plurality of memory tag bits; and
send the read or write memory operation to a memory connected to the processor with the one or more selected bits of the plurality of memory tag bits.

2. The processor of claim 1, wherein the plurality of memory tag bits comprises sixteen memory tag bits, wherein to select one or more of the plurality of memory tag bits comprises to select four memory tag bits.

3. The processor of claim 1, wherein the MMU is further to determine whether memory tag bits of the plurality of memory tag bits other than the selected one or more memory tag bits are correct values.

4. The processor of claim 3, wherein to determine whether memory tag bits of the plurality of memory tag bits other than the selected one or more memory tag bits are correct values comprises to determine whether memory tag bits of the plurality of memory tag bits other than the selected one or more memory tag bits are all zero.

5. The processor of claim 3, wherein the MMU is further to determine a pattern of bits based on the plurality of page tag bits, a secret key, the virtual memory address, or any combination thereof,
wherein to determine whether memory tag bits of the plurality of memory tag bits other than the selected one or more memory tag bits are correct values comprises to compare memory tag bits of the plurality of memory tag bits other than the selected one or more memory tag bits to the pattern of bits.

6. The processor of claim 3, wherein the MMU is further to:
abort the memory operation in response to a determination that the memory tag bits of the plurality of memory tag bits other than the selected one or more memory tag bits are not correct values; and
send the memory operation to a memory connected to the processor in response to a determination that the memory tag bits of the plurality of memory tag bits other than the selected one or more memory tag bits are correct values.

7. The processor of claim 1, wherein the MMU is to:
receive a memory allocation request prior to receipt of the read or write memory operation;
assign the virtual memory address based on the memory allocation request;
determine values for the plurality of page tag bits;
write the determined values for the plurality of page tag bits to the page table entry; and
return the virtual memory address in response to receipt of the memory allocation request.

8. The processor of claim 7, wherein the MMU is further to:
encrypt at least part of the virtual memory address before return of the virtual memory address.

9. The processor of claim 7, wherein to determine values for the plurality of page tag bits comprises to receive values from an operating system associated with the processor.

10. The processor of claim 7, wherein to determine values for the plurality of page tag bits comprises to determine values based on a random or pseudo-random number generator.

11. The processor of claim 1, wherein to access the page table entry comprises to access the page table entry in a translation lookaside buffer (TLB).

12. One or more non-transitory computer-readable storage media comprising a plurality of instructions stored thereon that, when executed by a processor, causes the processor to:
receive, by a processor core of the processor, a read or write memory operation comprising a virtual memory address, wherein the virtual memory address comprises a plurality of memory tag bits;
access, by memory management unit (MMU) of the processor, a page table entry based on the virtual memory address, wherein the page table entry comprises a plurality of page tag bits;

determine whether to abort the read or write memory operation based on a comparison between the plurality of page tag bits to the plurality of memory tag bits;

select, by the MMU, one or more of the plurality of memory tag bits based on the plurality of page tag bits; and send, by the MMU, the read or write memory operation to a memory connected to the processor with the one or more selected bits of the plurality of memory tag bits.

13. The one or more non-transitory computer-readable storage media of claim 12, wherein the plurality of instructions further cause the processor to determine, by the MMU, whether memory tag bits of the plurality of memory tag bits other than the selected one or more memory tag bits are correct values.

14. The one or more non-transitory computer-readable storage media of claim 12, wherein the plurality of instructions further cause the processor to:

receive, by the MMU, a memory allocation request prior to receipt of the read or write memory operation;

assign, by the MMU, the virtual memory address based on the memory allocation request;

determine, by the MMU, values for the plurality of page tag bits;

write, by the MMU, the determined values for the plurality of page tag bits to the page table entry; and return, by the MMU, the virtual memory address in response to receipt of the memory allocation request.

15. A method comprising:

receiving, by a processor core of a processor, a read or write memory operation comprising a virtual memory address, wherein the virtual memory address comprises a plurality of memory tag bits;

accessing, by a memory management unit (MMU) of the processor, a page table entry based on the virtual memory address, wherein the page table entry comprises a plurality of page tag bits;

determining, by the MMU, whether to abort the read or write memory operation based on a comparison between the plurality of page tag bits to the plurality of memory tag bits;

selecting, by the MMU, one or more of the plurality of memory tag bits based on the plurality of page tag bits;

determining whether memory tag bits of the plurality of memory tag bits other than the selected one or more memory tag bits are correct values; and sending, by the MMU the read or write memory operation to a memory connected to the processor with the one or more selected bits of the plurality of memory tag bits.

16. The method of claim 15, further comprising:

receiving, by the MMU, a memory allocation request prior to receipt of the read or write memory operation;

assigning, by the MMU, the virtual memory address based on the memory allocation request;

determining, by the MMU, values for the plurality of page tag bits;

writing, by the MMU, the determined values for the plurality of page tag bits to the page table entry; and returning, by the MMU, the virtual memory address in response to receipt of the memory allocation request.

* * * * *